United States Patent [19]

Voith

[11] Patent Number: 4,904,126

[45] Date of Patent: Feb. 27, 1990

[54] TRUCK MOUNTED VACUUM LOADING APPARATUS

[75] Inventor: Donald J. Voith, Milwaukee, Wis.

[73] Assignee: Water Services of America, Inc., Milwaukee, Wis.

[21] Appl. No.: 315,385

[22] Filed: Feb. 24, 1989

[51] Int. Cl.$^4$ ............................................. B65G 53/40
[52] U.S. Cl. .................................... 406/39; 406/171; 55/318
[58] Field of Search .................... 406/38, 39, 168, 171, 406/172; 55/318, 319, 321

[56] References Cited

U.S. PATENT DOCUMENTS

| | | | |
|---|---|---|---|
| 2,803,847 | 8/1957 | Hobbs | 406/39 |
| 3,476,439 | 11/1969 | Homan | 406/171 |
| 3,580,644 | 5/1971 | Ballard | 406/171 |
| 3,588,179 | 6/1971 | Gifford | 406/171 |
| 3,646,595 | 2/1972 | Williams | 406/171 |
| 3,995,754 | 12/1976 | De Koning | 406/39 |
| 4,017,281 | 4/1977 | Johnstone . | |
| 4,200,950 | 5/1980 | Coverley | 406/39 |
| 4,430,028 | 2/1984 | Clayton et al. | 406/39 |

OTHER PUBLICATIONS

VAC/ALL Model VCR 200 bulletin, Central Engineering Co., Inc., (undated).

DeMarco Vac Advanced Vacuuming Technology, DeMarco Max Corporation, 1986.

*Primary Examiner*—Sherman D. Basinger
*Assistant Examiner*—Stephen P. Avila
*Attorney, Agent, or Firm*—Andrus, Sceales, Starke & Sawall

[57] ABSTRACT

A vacuum loading apparatus is adapted to be mounted on the bed of a conventional pick-up truck and includes a primary particulate settling chamber and an integrally attached filter chamber having open communication with the settling chamber through a common separating wall. A pair of cylindrical filter units are mounted in the filter chamber, each filter unit has a pleated filter media disposed with its outer surface exposed to the particulate-carrying air. The open interior of the filter unit, comprising a clean air chamber, is divided into two sub-chambers by an impervious axially disposed separator and a compressed air nozzle is disposed adjacent the opening to each sub-chamber to direct a backflush jet of compressed air through the filter media to clean the entrained particulates therefrom. An appropriate control system sequentially operates the compressed air nozzles to clean one filter sub-chamber at a time and the cleaning process may be carried out concurrently with normal filtering operation of the unit.

13 Claims, 3 Drawing Sheets

TRUCK MOUNTED VACUUM LOADING APPARATUS

BACKGROUND OF THE INVENTION

The present invention relates to an industrial vacuum loading device and, more particularly, to a mobile vacuum loading apparatus particularly adapted to be mounted on a conventional pick-up truck.

Industrial vacuum loading devices are well known in the art and are utilized in a wide variety of applications where large amounts of particulates, as well as much larger and heavier scrap and waste materials of many types, must be rapidly picked up and collected for disposal. An industrial vacuum loading apparatus utilizes a high volume induced air flow through a filter chamber to carry particulates and other materials into the chamber, where they are separated and filtered out of the airstream, collected by gravity in a lower collecting bin, and eventually removed for disposal. The clean filtered air drawn through the system by an induced draft blower is discharged to the atmosphere.

Large stationary and truck mounted vacuum loaders typically utilize several stages of separation for the particulates and other materials collected. Thus, the incoming particulate-laden air may be initially directed into a settling chamber where the heavy materials and large particulates drop out into a lower collecting bin. Some units then direct the particulate-laden air into a cyclone-type separator to remove an additional amount of the smaller particulates. The main filtering elements for these units typically comprise a bag house utilizing a series of cloth-like filter bags mounted on an open supporting framework and through which the air flow passes with the particulates being filtered out by the filter bags. The air exiting the bag house filters may be finally filtered by passing it through one or more filter cartridges, typically utilizing a conventional pleated filter media. The particulates and other materials which are collected by gravity in the lower collecting bins are discharged through lower hopper openings or by tilting the unit and dumping the particulates therefrom. The filter bags and filter cartridges are usually cleaned by directing a reverse backflushing jet of compressed air into the bag or cartridge outlet to dislodge the particulate material clinging to the upstream face of the filter media. The backflushed particulates typically fall by gravity to the bottom of the filter chamber and may be unloaded therefrom in a manner similar to the unloading of the main collecting bin. However, some industrial units are constructed with the filter housings located above the main collecting bin with discharge openings that can be selectively opened to allow the back flushed particulates to be discharged directly into the main collecting bin. This requires the flow of particulate-laden air to be temporarily halted or the flow through the filter chamber to be temporarily bypassed.

Because large industrial units can be sized to provide excess filter capacity, temporary shutoff or bypass of the particulate-laden air through a portion of the filter system to accommodate back flushing is generally not a problem. In addition, power requirements and size and space limitations are not critical problems in large industrial units, either stationary or mounted on heavy duty trucks. Thus, these units can be sized to provide large volumes of air flow, multiple separation and filtering stages, greatly excess filter capacity to allow on-stream cleaning, and large air compressors to provide the compressed air for back flush cleaning.

In attempting to downsize a stationary vacuum loader or a large mobile vacuum loader mounted on a heavy duty truck, the power requirements and the size and weight limitations present acute problems. The large volume filtering chamber needed to accommodate a conventional bag house filter is simply not available, for example, in the space confines provided by the bed of a conventional pick-up truck. Likewise, the space required for multiple separation and filtering stages is not available. Nevertheless, a real need exists for a smaller, less costly, and more mobile vacuum loader apparatus which can be mounted directly on a commercially available pick-up truck chassis.

As indicated, it is known in the art to utilize a filter cartridge having a pleated filter media for one filtering stage in a vacuum loading apparatus. It is also known to backflush such filter cartridges with a jet of compressed air injected into the cylindrical interior upstream side of the unit. However, in mobile vacuum loading apparatus, pleated filter cartridges have been relegated to secondary filtering stages where the particulate loadings are low and space is available to provide a high filtering capacity. In large stationary units, space is also generally not a problem and, therefore, filter cartridges providing an excess of filter capacity can be provided such that one or more filter cartridges may be periodically taken off-line for backflushing without interfering with the total flow of air through the system. Thus, the downsizing of heavy duty truck mounted or stationary vacuum loaders to adapt them to be used on smaller conventional pick-up truck bodies presents a number of problems which preclude straightforward reduction in size.

SUMMARY OF THE INVENTION

In accordance with the present invention a truck-mounted mobile vacuum loading apparatus, sized to be attached to a conventional pick-up truck bed, provides a simple 2-stage separation in a primary settling chamber and a directly connected filter chamber. The latter includes small number of filter cartridges utilizing a pleated filter media to filter out the particulates which do not drop out in the primary settling chamber. The pleated filter cartridges incorporate a unique internal separation construction which allows sequential backflushing of only a portion of each filter cartridge, thus removing no more than half the filtering capacity of a single filter cartridge from an on-line filtering mode at any one time. Thus, sequential backflushing of the filter units is accomplished on-line without any interruption or reduction in the primary flow of particulate-laden air through the system. The large filter media surface area allows the critically necessary reduction in the total volume occupied by the filter chamber.

The apparatus includes a unitary housing which defines a substantially enclosed primary settling chamber that receives an air flow through a particulate air inlet in one side wall and has a particulate collecting bin in the bottom, and a substantially enclosed filtering and secondary settling chamber having a common separating wall with the primary settling chamber. Particulate air passage means in the common separating wall directs the flow of partially cleaned particulate-laden air from the primary settling chamber into the filtering chamber and through the pleated filter media in preferably cylindrical cartridge type filter units disposed therein. Air flow is such that the filtered particulates are retained on the exposed outer surface of the filter media and the clean air passes to an interior clean air chamber having one axial open end. The outlets from the filter units open into a clean air plenum for common discharge through a downstream clean air outlet. Each filter unit includes an impervious separator axially disposed in the interior clean air chamber and dividing each chamber into two sub-chambers each of which opens into the clean air plenum. A source of compressed air is operatively connected to a series of compressed air nozzles mounted in the clean air plenum, one of each of which nozzles is disposed adjacent a sub-chamber opening to direct a jet of compressed air in a reverse cleaning direction through the filter unit. Appropriate control means operates to sequentially pulse the compressed air into each sub-chamber.

The apparatus includes a blower mounted in downstream communication with the clean air outlet to induce a continuous flow of air through the system. The control means for operating the compressed air back flushing nozzles is operable concurrently with operation of the blower. The filter cartridges are selected to provide a total filter media surface area sufficient to maintain a substantially constant volume of air flow through the apparatus during operation of the back-flushing nozzles.

The primary settling chamber includes a particulate collecting bin in the bottom thereof and the bottom of the filter chamber includes a sloping floor which opens in direct communication with the particulate collecting bin. The air passage means in the common separating wall between the settling chamber and filter chamber comprises a pair of substantially parallel vertically spaced air passages the lower of which has a lower edge defining the transition between the sloping floor of the filter chamber and the collecting bin.

Power from the pick-up truck engine can supply adequate power to drive both the blower and the air compressor, as well as the hydraulic lift to tilt the apparatus housing for unloading.

The provision of separators within the pleated filter cartridges to divide the same into multiple sub-chambers for backflushing allows the entire compressed air supply system to be down sized without sacrificing any back flushing efficiency. In addition, the compressed air back flushing pulse may be better concentrated to clean more effectively because of the reduced size of the separated sub-chamber.

Direct communication between the filter chamber and the settling chamber via the sloping floor and communicating air passage eliminates the need for a cycle door which must be closed to segregate two independent separation stages in prior art equipment.

DETAILED DESCRIPTION OF THE PREFERRED EMBODIMENT

Figure 1:
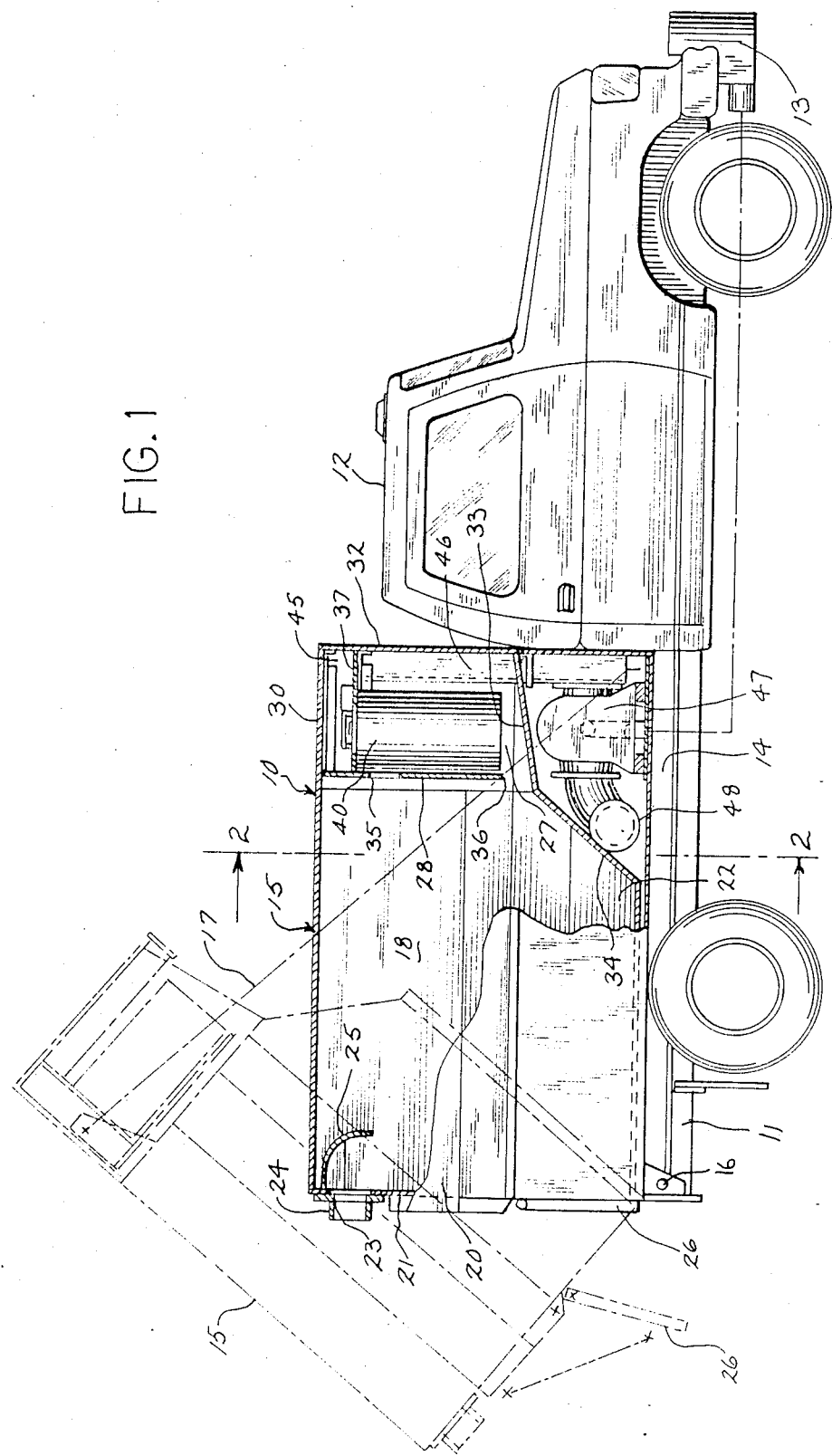
FIG. 1 is a side elevation of a pick-up truck mounted vacuum loading apparatus of the present invention, with portions broken away to show the interior construction.
Figure 2:
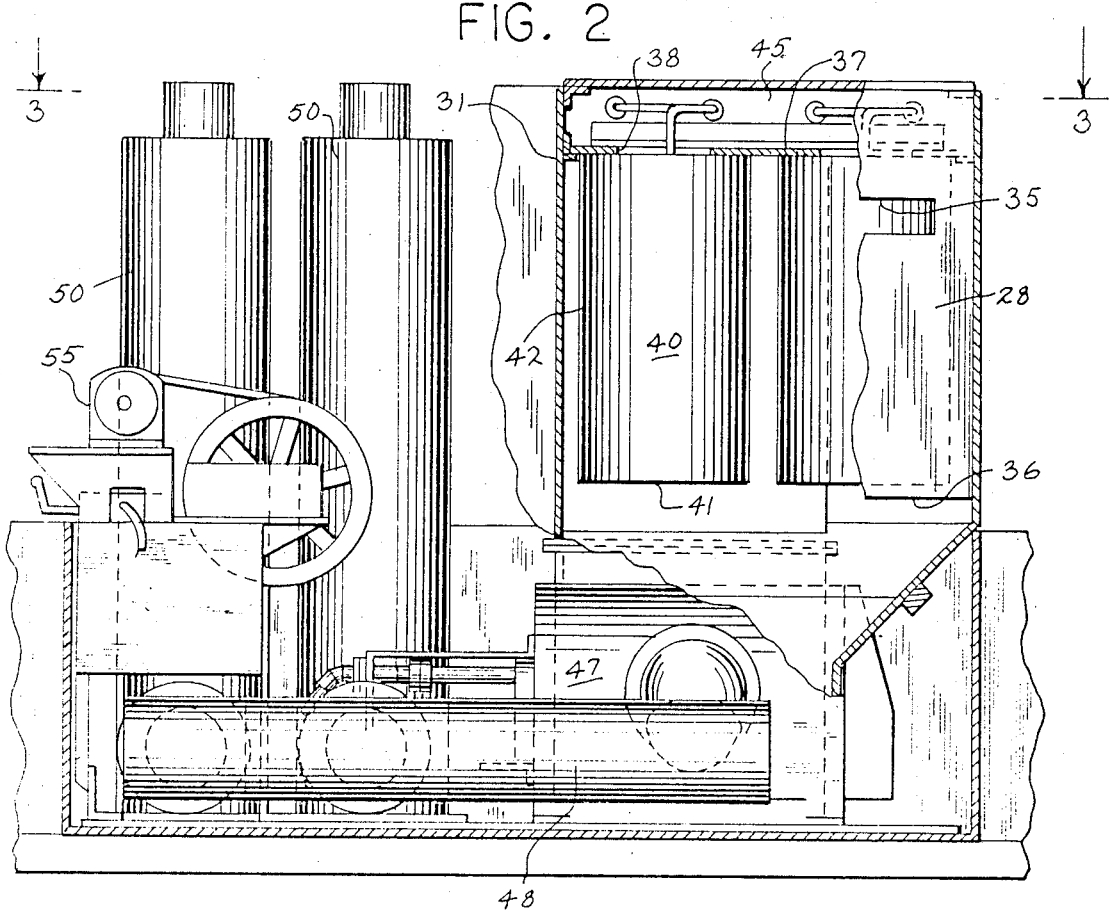
FIG. 2 is a vertical section through the vacuum loading apparatus taken on line 2—2 of FIG. 1.
Figure 3:
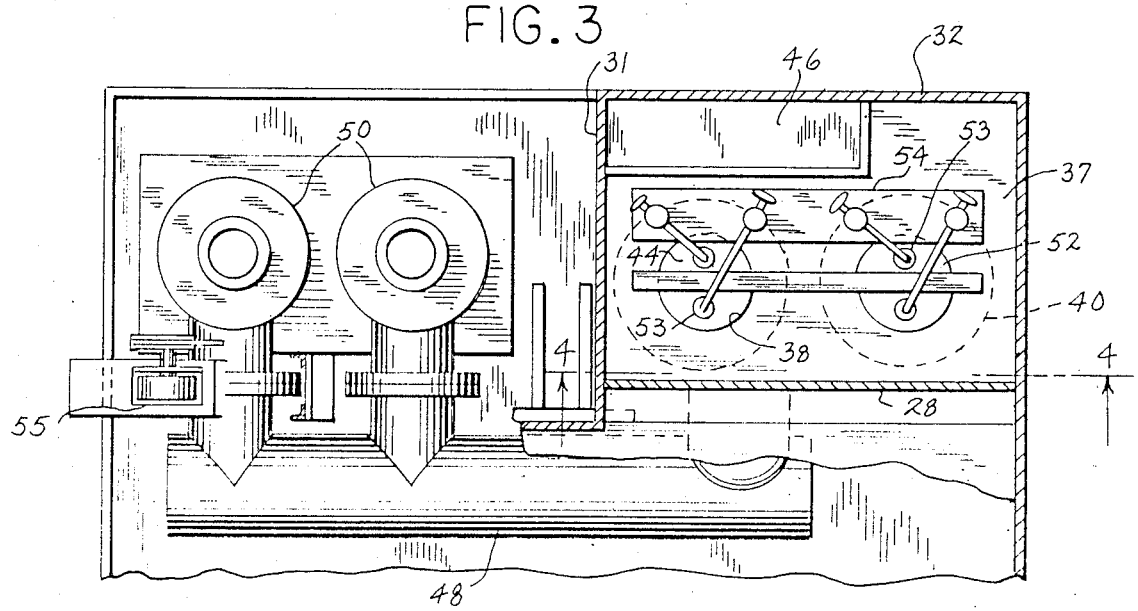
FIG. 3 is an enlarged top plan view of the forward portion of the apparatus, partly in section, showing details of the filter chamber construction.
Figure 4:
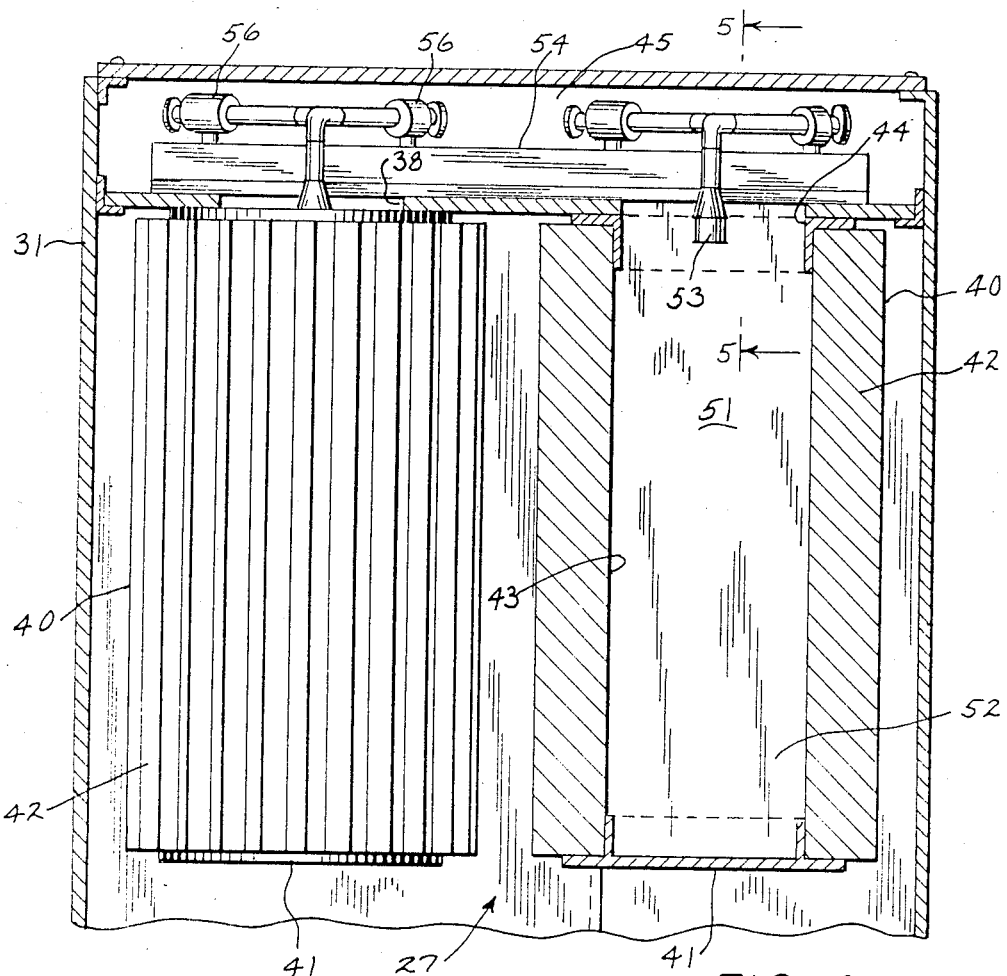
FIG. 4 is an enlarged vertical section through the filter chamber taken on line 4—4 of FIG. 3.
Figure 5:
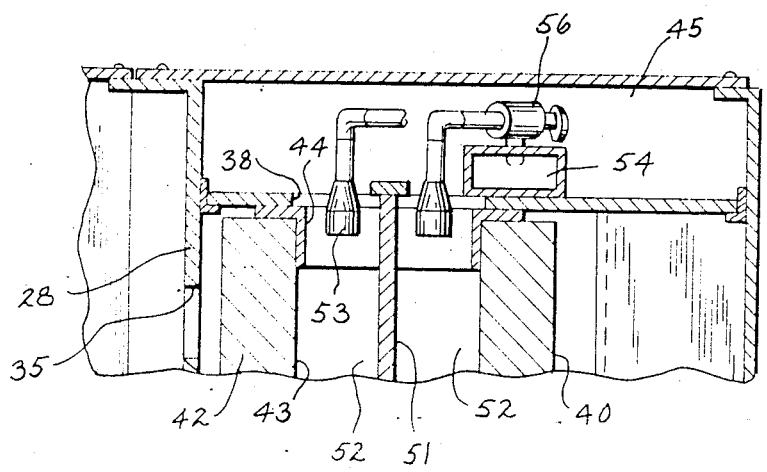
FIG. 5 is a vertical section through a filter cartridge taken on line 5—5 of FIG. 3.

A vacuum loading apparatus 10 of the present invention is adapted to be mounted on and attached to the bed 11 of a conventional pick-up truck 12. Operating power for various elements of the apparatus 10 (to be described hereinafter) is supplied from the truck engine, via a front mounted power takeoff and hydraulic pump assembly 13.

The vacuum loading apparatus 10 includes a supporting base 14 adapted to lie upon and be attached to the truck bed 11. A housing 15 for the vacuum loading apparatus is pivotally attached to the supporting base 14 by a pivotal connection 16 at the rear of the truck bed. An extensible hydraulic cylinder 17 interconnects the forward ends of the supporting base 14 and the upper part of the housing 15 to pivot the latter about the pivotal connection 16, as for unloading in a manner which will be described in more detail hereinafter.

The housing 15 defines a main particulate settling chamber 18 having a pair of upper side walls 20 and a rear wall 21. The side walls 20 taper downwardly from their lower edges to define an integral particulate collecting bin 22 directly beneath and in open communication with the settling chamber 18. A particulate air inlet 23 is disposed in the upper portion of the rear wall 21 and includes a flange 24 for the connection of a flexible hose or the like. A downwardly curving deflector plate 25 is attached to the inside of the rear wall 21 in line with the air inlet 23 to cause an initial downward deflection of particulates and other larger objects and materials entering the system through the air inlet. The narrower lower portion of the rear wall 21 is provided with a hinged unloading door 26.

A substantially enclosed filter and secondary settling chamber 27 is disposed immediately forward of the settling chamber 18 and separated therefrom by a common separating wall 28. The filter chamber 27 shares a common enclosing top wall 30 with the settling chamber 18, as well as a common side wall 20 on one side. The filter chamber 27 is substantially narrower than the settling chamber 18 and includes a vertical inner side wall 31 and a front wall 32. The bottom of the filter chamber 27 has a downwardly sloping floor 33 which intersects a steeper downwardly sloping bottom wall 34 comprising the forward face of the collecting bin 22. The separating wall 28 between the settling chamber and the filter chamber is provided with a pair of substantially parallel vertically spaced upper and lower transfer passages 35 and 36. The passages extend substantially the full width of the separating wall 28 and the upper transfer passage 35 is located near the upper edge thereof. The lower transfer passage 36 is located at the intersection of the downwardly sloping floor 33 of the filter chamber and the forward bottom wall 34 of the collecting bin. Thus, the lower transfer passage 36 provides a direct open communication between the intersecting floor 33 and bottom wall 34.

Within the filter chamber 27 and spaced below and parallel to the top wall 30 is a filter mounting plate 37. The mounting plate includes a pair of circular openings 38, and a pair of cylindrical filter units 40 are attached to the underside of the mounting plate, each surrounding an opening 38. Each filter unit 40 has a closed bottom wall 41 and an exposed filter surface comprising a conventional pleated filter media 42. The filter units 40 are disposed such that the air flow is radially inwardly with the filtered particulate material being trapped on the outer surface of the filter media 42. The filter media 42 is disposed to define a cylindrical open clean air chamber 43 on the interior thereof. The chamber 43 has an open upper end 44 in direct communication with a circular opening 38 in the mounting plate 37.

The mounting plate 37 and the top inside walls of the filter chamber 27 define a clean air plenum 45 which overlies the filter chamber 27 and filter units 40. The forward portion of the clean air plenum 45 opens into a downwardly extending clean air duct 46, the lower end of which is attached in open communication with the inlet of an induced draft blower 47. The blower 47 is mounted on the supporting base 14 directly beneath the filter chamber 27. The outlet from the blower 47 is connected to a clean air exhaust manifold 48 having two outlets attached to a pair of upwardly opening air silencers 50.

When the blower 47 is operating, an induced draft is created through the apparatus which draws air carrying particulates and other objects through the air inlet 23 and into the settling chamber 18. The deflector plate 25 imparts a downward direction to the airborne materials and, in conjunction with the immediate drop in air velocity, causes the heavier and larger particles and objects to fall into the collecting bin 22 at the bottom of the settling chamber. The particulate-laden air continues to flow in a forward direction through the settling chamber 18 and through the upper and lower transfer passages 35 and 36, respectively, in the separating wall 28. Most of the heavier and larger materials entrained in the air flow are removed in the settling chamber 18 and collect in the collecting bin 22. Thus, the air entering the filter chamber 27 generally contains smaller particulate materials. However, the face of the separating wall 28 between the transfer passages 35 and 36 does provide a shield for the filter media 42 to prevent any large particulates from impinging directly against the media. Air may, of course, enter the filter chamber through either transfer passage, however, the upper transfer passage 35 serves a potentially important backup function in the event that the particulates in the collecting bin 22 rise to a level sufficient to close off the lower transfer passage 36.

In addition to the particulates which are retained by the filter media 42, additional gravity settling occurs in the filter chamber and those particulates, along with the retained particulates which are backflushed from the filter media, collect on the rearwardly sloping floor 33 for eventual discharge through the lower transfer passage 36 into the collecting bin 22.

The clean air passing through the filter media 42 passes upwardly into the clean air plenum 45 and then downwardly through the clean air duct 46 and through the blower 47 for discharge in the manner previously described. As the filtering process proceeds, the filter media 42 will become increasingly saturated with retained particulate material and the media must, therefore, be periodically cleaned. As is well known in the art, backflushing with compressed air provides a convenient and effective manner of cleaning the filter media while continuing the filtering process through other filter units. However, in the apparatus of the present invention which preferably utilizes only two filter units 40, back flushing one unit obviously temporarily removes half of the system's filtering capacity. This is too disruptive to the flow through the system and, in addition, would require a large compressed air supply system to provide a pulse or jet of compressed air adequate to clean an entire filter unit 40 at one time. In the apparatus of the present invention, however, each filter unit 40 includes an interior separator 51 which is disposed in the clean air chamber 43 to divide the same into two semicylindrical sub-chambers 52. The sub-chambers 52 share the open upper end 44 of the clean air chamber 43 and thus open directly into the clean air plenum 45. A series of compressed air nozzles 53 are disposed in the clean air plenum 45, such that one nozzle 53 is located immediately adjacent the open upper end of each sub-chamber 52. The nozzles 53 are connected to a compressed air supply manifold 54 which, in turn, is supplied by an air compressor 55 driven by a hydraulic motor receiving fluid power from the hydraulic pump 13. Each nozzle assembly includes a control valve 56 such that the bank of nozzles 53 can be sequentially operated to direct a timed pulse of compressed air into each sub-chamber 52 to backflush the portion of the filter media in communication with the sub-camber. In the arrangement shown, roughly one-quarter of the total filtering capacity is taken off-line while the compressed air backflushing jet is being directed into the sub-chamber 52. Obviously, if more filter units 40 were utilized in the filter chamber 27, a smaller percentage of the total filtering capacity would be temporarily removed from on-line filtering while half of one unit is being cleaned by a backflush pulse of compressed air. It would also be possible to utilize a separator construction which would comprise a pair of integral separators 51 disposed normal to one another to divide the clean air chamber 43 within the filter unit into four quadrants. Each quadrant-shaped sub-chamber would have a separate nozzle disposed above its opening, thereby allowing just one-quarter of the total filter to be cleaned at one time in a sequential manner as described. Also, the clean air chamber could be divided with an appropriate separator construction into any desired number of sectors. Finally, of course, the filter units need not be of the preferred cylindrical construction, but may be of an oval, rectangular, or other convenient shape.

Various modes of carrying out the present invention are contemplated as being within the scope of the following claims particularly pointing out and distinctly claiming the subject matter which is regarded as the invention.

I claim:

1. A truck-mounted mobile vacuum loading apparatus comprising:
   a housing defining:
   a substantially enclosed primary particulate settling chamber having a particulate air inlet for receiving a flow volume of particulate-laden air and a particulate collecting bin in the bottom of the chamber, and
   a substantially enclosed secondary settling and filter chamber having a separating wall common with the primary chamber;
   particulate air passage means in said common separating wall for directing the flow of particulate-laden air from the primary chamber to the filter chamber;
   a filter unit having a particulate filter media of a pleated construction with its outer surface exposed to the particulate-laden air and its interior surface defining a clean air chamber having one open end;

a clean air plenum in open communication with the open end of said clean air chamber and having a clean air outlet;

a separator axially disposed in the clean air chamber and dividing the same into a plurality of sub-chambers each opening into said clean air plenum;

a compressed air nozzle for each sub-chamber, said nozzles disposed in the clean air plenum adjacent the sub-chamber openings;

a source of compressed air operatively connected to said nozzles; and, control means for directing a pulse of compressed air sequentially from each nozzle into its adjacent sub-chamber.

2. The apparatus as set forth in claim 1 including blower means downstream from the clean air outlet for inducing a continuous flow of air through the apparatus.

3. The apparatus as set forth in claim 2 wherein said control means is operative concurrently with operation of said blower means.

4. The apparatus as set forth in claim 3 wherein said filter media has sufficient surface area to maintain a substantially constant air flow volume through the apparatus during operation of said control means.

5. The apparatus as set forth in claim 4 including a particulate collecting bin in the bottom of the primary settling chamber.

6. The apparatus as set forth in claim 5 wherein the particulate air passage means comprises a pair of substantially parallel vertically spaced air passages.

7. The apparatus as set forth in claim 6 wherein said filter chamber includes a downwardly sloping floor terminating in the lower edge of the lower of said air passages so as to open directly into said collecting bin.

8. The apparatus as set forth in claim 1 including a plurality of filter units in the filter chamber.

9. The apparatus as set forth in claim 8 wherein said filter media is disposed in a cylindrical configuration.

10. The apparatus as set forth in claim 9 wherein the separator is disposed to divide each clean air chamber into two sub-chambers.

11. A mobile loading apparatus adapted to be mounted on the bed of a conventional pick-up truck, said apparatus comprising:

an enclosed primary particulate settling chamber having a particulate air inlet in one wall for receiving a flow of particulate-laden air and a particulate collecting bin in the bottom of the chamber;

an enclosed secondary settling and filter chamber having a separating wall common with the settling chamber and a downwardly sloping floor in open communication with said particulate collecting bin;

a pair of substantially parallel vertically spaced particulate air transfer passages in said common separating wall, the lower of said air passages defining the open communication between said floor and said collecting bin;

a filter unit mounted in the filter chamber and having an outer particulate filter media of a pleated construction disposed with its outer surface exposed to the particulate-laden air, and an interior clean air chamber having an open end connected to a clean air plenum;

a diametrically disposed impervious separator dividing each clean air chamber into a plurality of sub-chambers each opening into said clean air plenum;

a compressed air nozzle disposed in the clean air plenum adjacent each sub-chamber opening;

a source of compressed air operatively connected to said nozzles; and, control means for sequentially directing a back flush jet of compressed air from a nozzle into an adjacent sub-chamber.

12. The apparatus as set forth in claim 11 wherein the filter unit comprises a plurality of cylindrical filters each having a cylindrical interior clean air chamber.

13. The apparatus as set forth in claim 12 wherein each clean air chamber is divided into two sub-chambers.

* * * * *